United States Patent
Wan

(10) Patent No.: US 10,467,480 B2
(45) Date of Patent: Nov. 5, 2019

(54) VIDEO SURVEILLANCE DISPLAY SYSTEM

(71) Applicant: Zmodo Technology Shenzhen Corp. Ltd., Shenzhen (CN)

(72) Inventor: Kevin Kelin Wan, Champaign, IL (US)

(73) Assignee: Zmodo Technology Shenzhen Corp. Ltd. (CN)

( * ) Notice: Subject to any disclaimer, the term of this patent is extended or adjusted under 35 U.S.C. 154(b) by 55 days.

(21) Appl. No.: 15/237,097

(22) Filed: Aug. 15, 2016

(65) Prior Publication Data

US 2017/0364754 A1    Dec. 21, 2017

(30) Foreign Application Priority Data

Jun. 21, 2016 (CN) .......................... 2016 1 0454394

(51) Int. Cl.
*G06K 9/00* (2006.01)
*H04N 5/232* (2006.01)

(52) U.S. Cl.
CPC .......... *G06K 9/00771* (2013.01); *G06K 9/00* (2013.01); *H04N 5/232* (2013.01); *H04N 5/23229* (2013.01); *H04N 5/23293* (2013.01)

(58) Field of Classification Search
CPC ........................ G06K 9/00771; H04N 2/232
See application file for complete search history.

(56) References Cited

U.S. PATENT DOCUMENTS

| 6,184,935 B1 * | 2/2001 | Iaquinto | G06T 1/60 348/441 |
| 7,250,968 B2 * | 7/2007 | Ito | H04N 5/23209 348/240.2 |
| 7,271,838 B2 * | 9/2007 | Suekane | H04N 5/23293 348/222.1 |
| 7,508,418 B2 * | 3/2009 | Renkis | H04N 5/23203 348/211.2 |

(Continued)

FOREIGN PATENT DOCUMENTS

| CN | 1863266 A | 11/2006 |
| CN | 102801963 A | 11/2012 |
| CN | 102833525 A | 12/2012 |

*Primary Examiner* — Jayanti K Patel
*Assistant Examiner* — Irfan Habib
(74) *Attorney, Agent, or Firm* — Sterne, Kessler, Goldstein & Fox, P.L.L.C.

(57) ABSTRACT

A video surveillance display system comprises an image acquisition apparatus, an image processing apparatus, an image display apparatus, an image controlling apparatus and an image input apparatus. The image acquiring device is operatively connected to the image processing apparatus. The image display apparatus is operatively connected to the image processing apparatus and the image controlling apparatus. The image controlling apparatus is operatively connected to the image input apparatus. Users can choose which part of the video stream they want to watch by sending input commands to the system. The system can truncate the digital signal in accordance with the height and width of video frames and the default display as well as users commands to (Continued)

present the display images users chosen. The system can display images of different monitoring areas selected by the users and present the modularized high-definition image without compression to guarantee users' safety.

9 Claims, 3 Drawing Sheets

(56) References Cited

U.S. PATENT DOCUMENTS

| | | | |
|---|---|---|---|
| 8,184,710 B2 | 5/2012 | Srinivasan et al. | |
| 8,194,145 B2* | 6/2012 | Lee | G06T 3/4023 345/667 |
| 9,756,167 B2* | 9/2017 | Izutsu | G06F 3/1438 |
| 2001/0040585 A1* | 11/2001 | Hartford | G06T 3/4023 345/667 |
| 2005/0099509 A1* | 5/2005 | Kobayashi | H04N 5/235 348/229.1 |
| 2005/0104909 A1* | 5/2005 | Okamura | G06F 3/1454 345/698 |
| 2006/0066729 A1* | 3/2006 | Renkis | H04N 5/23203 348/211.2 |
| 2006/0176376 A1* | 8/2006 | Dyke | G06T 3/40 348/222.1 |
| 2006/0221198 A1* | 10/2006 | Fry | H04N 5/23293 348/222.1 |
| 2008/0049034 A1* | 2/2008 | Chin | G06F 3/1438 345/535 |
| 2008/0198933 A1 | 8/2008 | Srinivasan et al. | |
| 2008/0263146 A1* | 10/2008 | Habuto | G06F 1/1632 709/203 |
| 2010/0008424 A1* | 1/2010 | Pace | H04N 19/14 375/240.16 |
| 2010/0080473 A1* | 4/2010 | Han | H04N 19/62 382/233 |
| 2012/0236181 A1* | 9/2012 | Noyes | H04N 5/23296 348/240.2 |
| 2013/0093955 A1* | 4/2013 | Wang | H04N 5/272 348/584 |
| 2013/0287122 A1* | 10/2013 | Mizosoe | H04N 21/2365 375/240.26 |
| 2014/0240516 A1* | 8/2014 | Kolarov | H04N 5/265 348/180 |
| 2016/0066000 A1* | 3/2016 | Cunningham | H04N 21/242 725/116 |

* cited by examiner

VIDEO SURVEILLANCE DISPLAY SYSTEM

CROSS-REFERENCE TO RELATED APPLICATIONS

The present application claims priority under 35 U.S.C. § 119(a) to Chinese Patent Application No. 2016104543947, filed on Jun. 21, 2016, the entire contents of which are incorporated herein by reference.

FIELD

The present disclosure generally relates to the surveillance display technologies, in particularly, relates to a video surveillance display system.

BACKGROUND

As demands for security are ever increasing in modern society, security surveillance industry gradually comes into being. With the rapid development of the security surveillance industry, a growing number of surveillance projects and a surging amount of information are generated. Moreover, the market has an urgent need for surveillance devices with wide-angle and high-definition.

A conventional video surveillance display system acquires a rectangular video frame captured by an onsite camera, and the display window of the terminal display apparatus is also rectangular. The video frame is compressed in accordance with rectangular display window and displayed in the display window. Since the video frame is compressed at the terminal display apparatus, it is a pity that images derived from the compressed video frame always have a low definition.

SUMMARY

The presently disclosed embodiments are directed to solving issues related to the problems presented in the prior art, as well as providing additional features that will become readily apparent by reference to the following detailed description when taken in conjunction with the accompanying drawings.

A video surveillance display system comprises an image acquiring device, an image processing apparatus, an image display apparatus, an image controlling apparatus, and an image input apparatus. The image acquiring device is operatively connected to the image processing apparatus. The image display apparatus is operatively connected to the image processing apparatus and the image controlling apparatus. The image controlling apparatus is operatively connected to the image input apparatus.

The image acquiring apparatus captures a video stream onsite, and outputs the image signal obtained by processing the video stream.

The image processing apparatus receives the image signal and converts it into a digital signal. The image processing apparatus also gets the video frame data from the image signal, which includes the height and width of the video frame. The digital signal is truncated in accordance with the height and width of video frame and the default display screen. Then the image processing apparatus outputs the display image recovered from the truncated digital signal.

The image input apparatus sends the input commands to the image controlling apparatus. Based upon the input commands, the image controlling apparatus instructs the image display apparatus to receive and present corresponding images.

With the video surveillance display system, users can choose which part of the video stream they want to watch by sending input commands to the system. The system truncates the digital signal in accordance with the height and width of the video frame and the default display screen to present the images. The system can display images of different monitoring areas selected by the users and present modularized high-definition images without compression to guarantee users' safety. Furthermore, users can easily adjust the monitoring area by sending input commands.

DETAILED DESCRIPTION OF EXEMPLARY EMBODIMENTS

Figure 1:
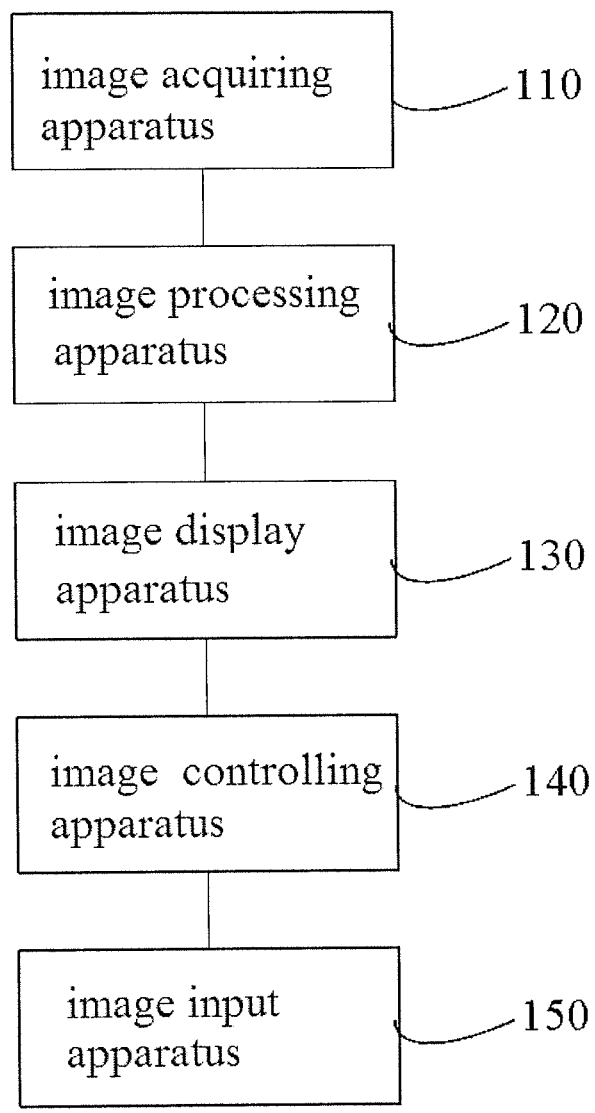
FIG. 1 illustrates the structure of a video surveillance display system in one embodiment.

In one embodiment, a video surveillance display system, as shown in FIG. 1, includes an image acquiring device 110, an image processing apparatus 120, an image display apparatus 130, an image controlling apparatus 140, and an image input apparatus 150. The image acquiring device 110 is operatively connected to the image processing apparatus 120. The image display apparatus 130 is operatively connected to the image processing apparatus 120 and the image controlling apparatus 140. The image controlling apparatus 140 is operatively connected to the image input apparatus 150.

The image acquiring apparatus 110 captures onsite video streams, and outputs image signals generated by processing the captured video streams.

The image acquiring apparatus 110 may be a video camera, which captures the onsite video streams. A video stream can be processed as a stable and continuous flow of video frames through the network. It is possible to display data before an entire file is completely transmitted. Specifically, a video stream may comprise video frames and video frame data, wherein the video frame data may include information such as height, width, encoding format, time stamp of a video frame, etc. The format of the video stream can vary. In the present embodiment, the video stream is in YUV format, which consumes less bandwidth compared with other formats.

The video stream can be encapsulated. In the present embodiment, the video stream can be encapsulated in accordance with the H.265 standard or the H.264 standard. For example, the image acquiring apparatus 110 encapsulates the captured video stream in accordance with the H.265 standard or H.264 standard, and converts the encapsulated video stream into an image signal. Through encapsulation and conversion of the video stream, data security can be enhanced in the course of data transmission. It should be understood that, in other embodiments, it is also possible that the image acquiring device 110 does not encapsulate the video stream.

The type of the image acquiring apparatus 110 can vary. In the present embodiment, the image acquiring apparatus 110 is a wide-angle video camera. Using a wide-angle video camera, users can view a wide-angle video using the security monitoring equipment, which better guarantees users' safety by mitigating the security risks associated with a limited surveillance scope.

Further, the wide-angle video cameras may be wide-angle infrared cameras capable of functioning at night and in other relatively dark environments, which improves reliability of the surveillance system and mitigates relevant security risks.

The image processing apparatus 120 receives the image signal and converts it into a digital signal. The image processing apparatus 120 also gets the video frame data from the image signal, which includes the height and width of the video frame. The digital signal is then truncated in accordance with the height and width of the video frame and the default display screen. Subsequently, the image processing apparatus 120 outputs an image recovered from the truncated digital signal for display.

The height and width of the default display screen is equal to the height and width of the screen of the image display apparatus 130, which can be obtained and stored in advance. After receiving the image signal, the image processing apparatus 120 converts the image signal into the digital signal, and truncates the digital signal in accordance with the height and width of the video frame and the default display screen. After the truncation is performed, the image processing apparatus 120 renders the digital signal to output an image having a size being consistent with the size of the default display screen. In present embodiment, OpenGL (Open Graphics Library)-based GPU (Graphic Processing Unit) may be utilized for rendering and recovering the truncated digital signal to obtain the image for display.

In one embodiment, the video stream is encoded. The video frame data includes an encoding format. The image processing apparatus 120 obtains the encoding format by analyzing the image signal, decodes and converts the image signal in accordance with the encoding format, to obtain the height and width of the digital signal and video frames. Specifically, after the image processing apparatus 120 receives the image signal, it analyzes each video frame to obtain the encoding format. Then, the image processing apparatus 120 parses out the height and width of the digital signal and video frames, and finally converts the decoded image signal into the digital signal.

The image input apparatus 150 sends an input command to the image controlling apparatus 140. Based upon the input command, the image controlling apparatus 140 instructs the image display apparatus 130 to obtain and present corresponding images.

The specific type of the image input apparatus 150 varies. It can be mobile phones, tablet, PCs and other mobile terminals. Users can choose which part of the video stream they want to watch by sending input commands to the image input apparatus 150. For the various types of the image input apparatus 150, the format of input commands could be different. For example, when the image input apparatus 150 is a device with touchscreen, users can send input commands by gestures.

The way in which the image controlling apparatus 140 instructs the image display apparatus 130 to receive and present a corresponding image in accordance with an input command varies. In one embodiment, the image processing apparatus 120 truncates the digital signal into several segments according to the height and width of video frames and the default display screen. The image processing apparatus 120 also recovers the truncated segments respectively, to obtain the corresponding display images. The image controlling apparatus 140 controls the image display apparatus 130 to present the received corresponding display images.

Specifically, the image processing apparatus 120 can divide a video frame into several video areas, which have the height and width the same as those of the display screen. The image processing apparatus 120 can obtain a digital signal of each video area respectively, and recover the digital signal to obtain a corresponding display image. Users can send input commands to the image controlling apparatus 140 via the image selection menu on the image display apparatus 130. The image controlling apparatus 140 instructs the image display apparatus 130 to get corresponding images from the image processing apparatus 120 according to input commands sent by users.

For example, the video frame is divided into 8 video areas by the image processing apparatus 120. The image processing apparatus 120 can obtain the digital signal of each video area and then recovers corresponding display images. There are 8 buttons in the image selection menu on the image display apparatus 130 labeled with the "Scene 1", "Scene 2" or other words-related image information. When a user chooses one of the buttons, the image controlling apparatus 140 instructs the image display apparatus 130 to get the images corresponding to the button from the image processing apparatus 120 and then present the display images.

Alternatively, for example, the image display apparatus 130 and the image input apparatus 150 are devices with touchscreen, and the video frame is divided into 8 video areas by the image processing apparatus 120. The image processing apparatus 120 can obtain the digital signal of each video area, and then recovers the corresponding display images. The image controlling apparatus 140 can obtain the display images according to users' sliding gesture on the devices with touchscreen. For illustration, when there is a specific image shown on the image display apparatus 130, and the user makes a gesture of sliding to the left side, the image processing apparatus 120 will obtain a digital signal of the video area which is on the right side next to the currently shown video area, and then sends the corresponding image recovered from the digital signal to the devices with touchscreen, to make the viewpoint position of the scene shown on the touchscreen appear to move rightward.

In this embodiment, a video frame is divided into a plurality of video areas, and then an image is recovered from a digital signal of each of these video areas. Users can select video areas from the image selection menu on the image display apparatus 130, and send the input commands via the image input apparatus to make the image of the selected video area present on the screen.

In another embodiment, the image controlling apparatus 140 sends the input commands to the image processing apparatus 120 via the image display apparatus 130. The image processing apparatus 120 decides the video area to be presented according to the height and width of video frames and the default display screen as well as the input commands, acquires the corresponding digital signal and sends an image recovered from the digital signal to the image display apparatus 130 for display.

Specifically, the image display apparatus 130 and the image input apparatus 150 can be devices with touchscreens. After the image processing apparatus 120 receives the first frame of the video stream, it can truncate the signal to obtain the preset area of the video frame as the video area to be presented in accordance with the height and width of the video frames and the default display screen. For example the image processing apparatus 120 can recover an image from the digital signal of the center area of the video frame and send the image to the devices with touchscreens for display. It should be understood that the specific location of the preset area may vary.

When users view images through the device with a touchscreen, they can change the displayed images by sliding gesture. For example, when the user slides to the left, the image processing apparatus 120 will move the video area displayed from the center of the video frame to the right side. The image processing apparatus 120 will also obtain the digital signal for the video area to be presented and send the corresponding images recovered to the devices with touchscreens for display. Therefore, the viewpoint position of the scene shown on the screen will move rightward. The movement amplitude of the viewpoint position is determined by the sliding amplitude. If the movement amplitude of the viewpoint position is same as the sliding amplitude, then the height and width of the video frame determines the border of the sliding.

In this embodiment, users can send input commands by moving the viewpoint position of the scene displayed on the image display device 130 to view the images of different monitoring areas. Users can adjusted the viewpoint position according to their needs, which improves convenience of operation.

The type of the image display apparatus 130 may vary. In the present embodiment, the image display apparatus 130 is an electronic display device with applications installed. The electronic display device can control display of the images by an application installed thereon.

In the present video surveillance display system, a user can choose which part of the video stream they want to watch by sending input commands to the system. The system can truncate the digital signal in accordance with the height and width of video frames and the default display as well as user commands to present the display images which are chosen. The system can display images of different monitoring areas selected by the user and present the modularized high-definition image without compression to guarantee the user's safety. In addition, the user may also adjust the monitoring area by sending commands, which further improves convenience of operation.

Figure 2:
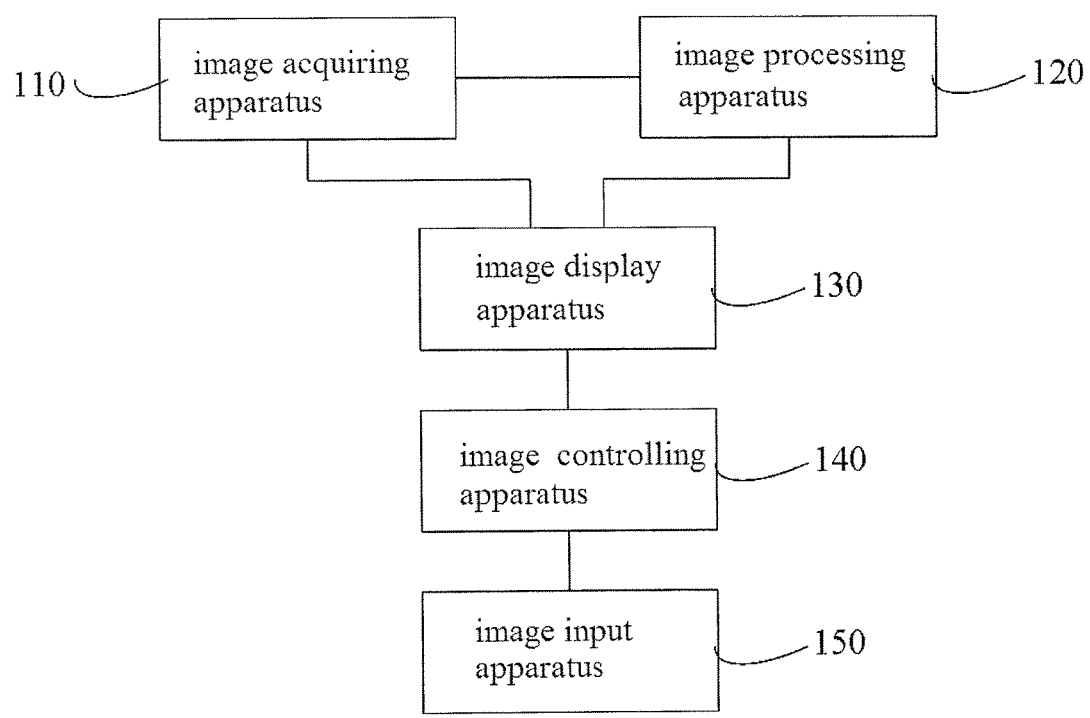
FIG. 2 illustrates the structure of a video surveillance display system in one further embodiment.

In one embodiment, as shown in FIG. 2, the image acquiring apparatus 110 is operatively connected to the image display apparatus 130. If it does not receive the input commands, the image controlling apparatus 140 may also instruct the image display apparatus 130 to directly obtain image signals from the image acquiring apparatus 110, compress the image to get a panoramic image, and then present it.

If the user does not make input commands via the image input apparatus 150, the image controlling apparatus 140 may instruct the image display apparatus 130 to directly obtain image signals from the image acquiring apparatus 110, compress the image to get a panoramic image, and then present it.

In one embodiment, the image acquiring device 110 comprises an analog-digital converter, a DSP (digital signal processing) processor, and a digital-analog converter. The analog-digital converter is operatively connected to the DSP processor. The digital-analog converter is operatively connected to the DSP processor and the image processing apparatus 120.

After the analog-digital converter converts the analog signal into the video digital signal, the DSP processor processes the video digital signal. Then the digital-analog converter converts the digital signal to analog signal, and outputs it to the image processing apparatus 120. Further the digital-analog converter is operatively connected to the image display apparatus 130, and output the digital signal to the image display apparatus 130.

Figure 3:
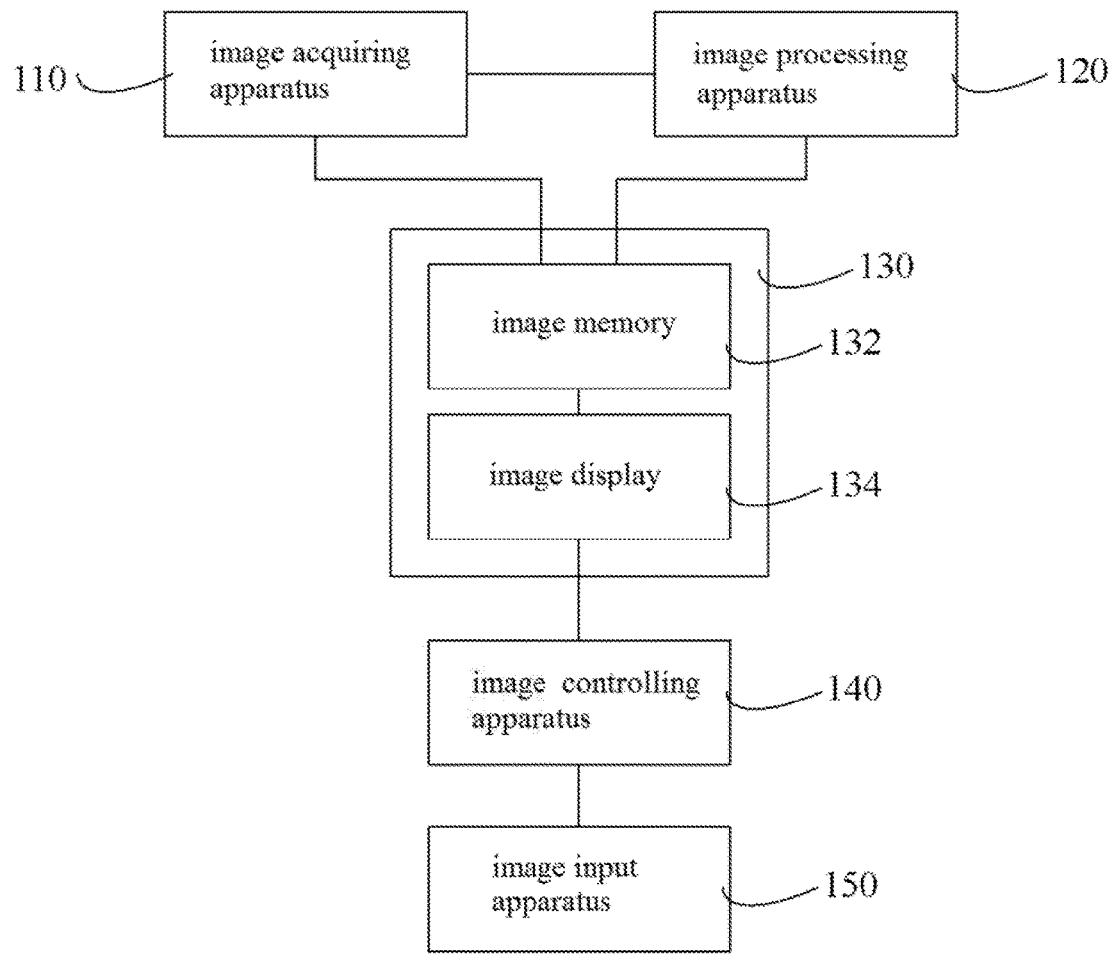
FIG. 3 illustrates the structure of a video surveillance display system in another embodiment.

In one embodiment, as shown in FIG. 3, the image display apparatus 130 includes an image memory 132 and an image display 134. The image memory 132 is operatively connected to the image acquiring apparatus 110 and the image processing apparatus 120. The image display 134 is operatively connected to the image memory 132 and the image controlling apparatus 140. The image memory 132 stores the display image from the image acquiring apparatus 110 and the image processing apparatus 120. Depending on whether the image controlling apparatus 140 receives input commands, it may instruct the image display 134 to present corresponding images accordingly.

For example, the image processing apparatus 120 divides a video frame into several video areas. The image processing apparatus 120 obtains digital signals corresponding to different video areas respectively, and outputs the display images recovered from these digital signals to the image memory 132 for storage in advance. If the image controlling apparatus 140 receives an input command, the image display 134 will obtain corresponding display images from the image memory 132 for display. If the image controlling apparatus 140 does not receive an input command, the image display 134 will obtain an image signal acquired by the image acquiring apparatus 110 from the image memory 132, decompresses the image signal to get a panoramic image, and then presents it.

In this embodiment, the image controlling apparatus 140 can instruct the image display 134 to present display images received from the image memory 132, which stores the image data in advance, to provide a video stream without interruptions, thereby improving the reliability of video surveillance system.

Further, the video surveillance display system may include an image transmitter. The image acquiring apparatus 110 is operatively connected to the image processing apparatus 120 via the image transmitter. The image transmitter may be a wired transmitter or a wireless transmitter, like a WIFI transmitter, etc.

While various embodiments of the present disclosure have been described above, it should be understood that they are presented for the purpose of illustration, and shall not be interpreted in a limiting way. Likewise, the various accompanying drawings may depict example structures or configurations for the purpose of illustration, hence they are used to help a reader understand the features and functionalities of the present disclosure that can be incorporated into the disclosure. The disclosure is not restricted to the illustrated example structures or configurations, but can also cover a variety of alternative structures and configurations, provided that these alternative structures and configurations do not go beyond the scope and spirit of the present disclosure.

Additionally, although the disclosure is described above in terms of various exemplary embodiments and implementations, it should be understood that the various features and functions described in one or more of the individual embodiments are not limited in their applicability to the particular embodiment with which they are described. They instead can be applied alone or in some combination, to one or more of the other embodiments of the disclosure, whether or not such embodiments are described, and whether or not such features are presented as being a part of a described embodi-

What is claimed is:

1. A system for video surveillance display, comprising:
an image acquiring apparatus configured to obtain an onsite video stream comprising a video frame and generate an image signal from the onsite video stream;
an image input apparatus configured to receive input commands from a user;
an image display apparatus configured to present images on a display screen;
an image processing apparatus configured to receive the image signal from the image acquiring apparatus, obtain video frame data comprising a height and a width of the video frame from the image signal, convert the image signal into a digital signal, truncate the digital signal in accordance with the height and width of the video frame and a height and a width of the display screen without compression, recover an uncompressed image from the truncated digital signal, and output the recovered uncompressed image to the image display apparatus for displaying the recovered uncompressed image; and
an image controlling apparatus configured to receive the input commands from the image input apparatus, and control the image display apparatus to present the recovered uncompressed image received from the image processing apparatus,
wherein the image processing apparatus is further configured to truncate the digital signal into several segments in accordance with the height and width of the video frame and the height and width of the display screen, and recover a plurality of images from the several segments, and
wherein the image controlling apparatus is further configured to instruct the image display apparatus to present the recovered plurality of images in accordance with the received input commands.

2. The system of claim 1, wherein
the image controlling apparatus is further configured to transmit the input commands to the image processing apparatus through the image display apparatus; and
the image processing apparatus is further configured to determine a height and a width of video areas in accordance with the height and width of the video frame, the height and width of the display screen, and the input commands, and instruct the image display apparatus to present recovered images.

3. The system of claim 1, wherein
the image acquiring apparatus is operatively connected to the image display apparatus; and
the image controlling apparatus is further configured to, in response to not receiving the input commands, instruct the image display apparatus to receive the image signal from the image acquiring apparatus and compress the received image signal to present a panoramic image.

4. The system of claim 1, wherein
the image display apparatus further comprises an image memory;
the image memory is operatively connected to the image acquiring apparatus and the image processing apparatus; and
the image display is operatively connected to the image memory and the image controlling apparatus.

5. The system of claim 1, wherein
the video stream is encoded;
the video frame data comprises an encoding format of the video frame; and
the image processing apparatus is further configured to decode the image signal to obtain the height and width of the video frame based on the encoding format obtained by analyzing the image signal.

6. The system of claim 1, wherein
the image acquiring apparatus comprises an analog-digital converter, a digital signal processing (DSP) processor, and a digital-analog converter;
the DSP processor is operatively connected to the analog-digital converter; and
the digital-analog converter is operatively connected to the DSP processor and the image processing apparatus.

7. The system of claim 1, wherein the image acquiring apparatus is a wide-angle video recording device.

8. The system of claim 7, wherein the wide-angle video recording device is an infrared wide-angle video camera.

9. The system of claim 1, further comprising a transmitter, wherein the image acquiring apparatus is operatively connected to the image processing apparatus via the transmitter.

* * * * *

UNITED STATES PATENT AND TRADEMARK OFFICE
CERTIFICATE OF CORRECTION

| | |
|---|---|
| PATENT NO. | : 10,467,480 B2 |
| APPLICATION NO. | : 15/237097 |
| DATED | : November 5, 2019 |
| INVENTOR(S) | : Kevin Kelin Wan |

Page 1 of 1

It is certified that error appears in the above-identified patent and that said Letters Patent is hereby corrected as shown below:

On the Title Page

Item (57), please delete "users commands to present the display images users chosen" and insert --users' commands to present the display images users have chosen--.

Signed and Sealed this
Fifth Day of May, 2020

Andrei Iancu
*Director of the United States Patent and Trademark Office*